United States Patent
To et al.

(10) Patent No.: US 8,447,229 B2
(45) Date of Patent: May 21, 2013

(54) RADIO COMMUNICATION SYSTEM, BASE STATION APPARATUS AND RELAY STATION APPARATUS

(75) Inventors: Shimpei To, Osaka (JP); Minoru Kubota, Osaka (JP); Yasuhiro Hamaguchi, Osaka (JP); Osamu Nakamura, Osaka (JP); Kazunari Yokomakura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 423 days.

(21) Appl. No.: 12/935,964

(22) PCT Filed: Mar. 26, 2009

(86) PCT No.: PCT/JP2009/056144
§ 371 (c)(1),
(2), (4) Date: Nov. 2, 2010

(87) PCT Pub. No.: WO2009/128330
PCT Pub. Date: Oct. 22, 2009

(65) Prior Publication Data
US 2011/0045765 A1    Feb. 24, 2011

(30) Foreign Application Priority Data

Apr. 18, 2008    (JP) .............................. 2008-108634

(51) Int. Cl.
*H04Q 7/20*    (2006.01)

(52) U.S. Cl.
USPC ............ 455/7; 455/11.1; 455/12.1; 455/13.1; 455/445; 455/422.1; 370/279; 370/310; 370/315; 370/328; 370/329

(58) Field of Classification Search
USPC .......... 455/7, 11.1, 12, 1, 13.1, 15, 21, 422.1, 455/403, 445, 561, 550.1, 517, 500, 3.01–3.06, 455/414.1–414.4, 426.1, 426.2; 370/279, 370/310, 315, 328, 329, 343; 375/211, 213
See application file for complete search history.

(56) References Cited

U.S. PATENT DOCUMENTS

| | | | |
|---|---|---|---|
| 7,606,182 B2 * | 10/2009 | Park et al. | .................... 370/279 |
| 2003/0123401 A1 | 7/2003 | Dean | |
| 2008/0045270 A1 * | 2/2008 | Suga | ............................ 455/561 |

FOREIGN PATENT DOCUMENTS

JP    2006-505146 A    2/2006

OTHER PUBLICATIONS

Popovski, P. and de Carvalho, E. "Spectrally-Efficient Wireless Relaying based on Superposition Coding" Vehicular Technology Conference 2007. VTC2007—Spring. IEEE 65th, Apr. 25, 2007, pp. 2936-2940.

*Primary Examiner* — Keith Ferguson
(74) *Attorney, Agent, or Firm* — Birch, Stewart, Kolasch & Birch, LLP

(57) ABSTRACT

In a radio communication system including a base station apparatus 10, a relay station apparatus 20 that receives a signal transmitted from base station apparatus 10 and re-transmits the signal to terminal apparatuses, a terminal apparatus 30 that directly receives the signal transmitted from the base station apparatus and a terminal apparatus 32 that receives the signal transmitted from base station apparatus 10 via relay station apparatus 20, base station apparatus 10 sets the transmission power of a signal addressed to terminal apparatus 30 high and the transmission power of a signal addressed to terminal apparatus 32 low, adds up the signals and transmits the resultant signal. With this, the signal addressed to the terminal apparatus that directly communicates with the base station apparatus and the signal addressed to the terminal apparatus that communicates with the base station apparatus via the relay station apparatus are multiplexed and transmitted simultaneously, whereby it is possible to provide a radio communication system and the like that enable efficient communication.

16 Claims, 14 Drawing Sheets

RADIO COMMUNICATION SYSTEM, BASE STATION APPARATUS AND RELAY STATION APPARATUS

TECHNICAL FIELD

The present invention relates to a radio communication system and the like including a base station apparatus, a relay station apparatus that receives a signal transmitted from the base station apparatus and retransmits a signal to a terminal apparatus, a first terminal apparatus that directly receives the signal transmitted from the base station apparatus and a second terminal apparatus that receives the signal transmitted from the base station apparatus via the relay station apparatus.

BACKGROUND ART

In order to solve the tightness of frequency resources with recent increase in the volume of data communication, new radio frequencies have been allocated for mobile communications so as to proceed with construction of new mobile communication systems(e.g., IMT-Advanced system) using the allocated frequency bands.

For such new mobile communication systems, higher frequency bands compared to the frequency bands that have been allocated to the existing systems will be allocated. However, a signal having the higher frequency will attenuate more greatly so that the coverage will become narrower compared to the existing systems. As a means for solving this problem, there is a method in which a relay station apparatus that relays communication between the base station apparatus and a terminal apparatus is provided in the cell, as shown in FIG. 15.

FIG. 15 shows a conventional radio communication system using a relay station apparatus. Terminal apparatuses 80, 82 and 84 exist in the communication area of a base station apparatus 90. Also, a relay station apparatus 92 is deployed therein. Relay station apparatus 92 re-transmits a signal received from base station apparatus 90 to terminal apparatuses.

Here, the relay station apparatus may be of a type that performs transmission by just amplifying the received signal (Amplify-and-Forward: AF type), a type that performs transmission by demodulating the signal once and re-modulating the signal if no error is found (Decode-and-Forward: DF type) or the like, and performs communication between the base station apparatus and a terminal apparatus far away from the base station apparatus (terminal apparatus that is located near the cell edge) through the relay station itself so as to keep the cellular coverage equivalent to that of the existing system without degrading reception performance of the terminal apparatuses.

However, in the system including this relay station apparatus, when a signal is transmitted to a terminal apparatus that is located a certain distance away from the base station apparatus, the signal for one frame is transmitted using two frames due to the intermediary of the relay station apparatus. Specifically, as shown in FIG. 16, two frames, one frame (frame F900) for transmission from base station apparatus 90 to relay station apparatus 92 and another frame (frame F902) for transmission from relay station apparatus 92 to terminal apparatus 80, are used. Accordingly, there occurs the problem of transmission efficiency being lowered. Here, it should be noted that frame F900 and frame F902 are of the same signal.

As a measure to deal with the above problem, there is a known technology in which a technique called superposition coding is applied to the relay system (e.g., see non-patent document 1).

In non-patent document 1, since the transmission takes a time of two-frames, though reception performance can be improved by increasing each of the numbers of reception and transmissions each by one by use of a relay station apparatus, description is made on how to relay data corresponding to two frames by two frames without reducing frame efficiency.

The radio communication system described in non-patent document 1 will be explained with reference to FIGS. 17 and 18. As shown in FIG. 18, base station apparatus 90 transmits combination of two signals (A and B) that are made different in power, in the first frame F920. Here, a (0<a<0.5) given in FIGS. 17 and 18 is a coefficient for dividing the power for each signal. Since relay station apparatus 92 needs to receive the signal transmitted from base station apparatus 90, the relay station apparatus does not perform transmission in frame F922.

Further, though transmission from base station apparatus 90 to terminal apparatus 82 is usually performed in frame F924, no particular description on this transmission is given in non-patent document 1 . Here, the signal transmitted in frame F922 shown in FIG. 18 is received by relay station apparatus 92 as a received signal r given as the following mathematical expression 1:

$$r = (\sqrt{1-a}A + \sqrt{a}B) + n \qquad \text{[Math 1]}$$

where A and B represent modulated signals to be transmitted and n represents noise. Here, no channel variation is considered, for simplicity. The relay station apparatus 92, which has received the signal shown in Math Ex. 1, demodulates signal A that has been transmitted at the higher power, first. At this time, signal B is handled as interference. Then, the demodulated signal is re-modulated, and a subtraction as follows is performed:

$$\begin{aligned} r &= (\sqrt{1-a}A + \sqrt{a}B) + n - \sqrt{1-a}A \qquad \text{[Math 2]} \\ &= \sqrt{a}B + n \end{aligned}$$

When a subtraction of signal A that has been re-modulated by considering power distribution is carried out, signal B added with noise as shown in Math Ex. 2 is extracted. Relay station apparatus 92 demodulates this signal so as to obtain the demodulated result of signal B.

Here, it should be assumed that transmission performance between base station apparatus 90 and relay station apparatus 92 are constantly favorable and the SNR of signal B is high to a certain extent. With this subtraction process, it is also possible to demodulate the signal B that was transmitted at the low power. This relay station apparatus 92 re-transmits the signal B that was transmitted from base station apparatus 90 at the lower power, of the two previously demodulated signals.

Further, in non-patent document 1, the relay station apparatus uses a method by which a signal B' that is encoded using an encoding rate being different from that of the base station apparatus is re-transmitted, taking into consideration the channel condition between the relay station apparatus and the terminal apparatus. In the terminal apparatus, the signal that was transmitted in the first frame is retained without demodulating and the signal B' that was transmitted in the next frame is demodulated first. Then, the result is encoded at the encoding rate used in the base station apparatus, then modulated, and multiplied by the coefficient that represents power distribution, so that the calculated result is subtracted from the retained, received signal in the first frame, thereby extracting the signal A, which was transmitted at the higher power from the base station apparatus, for demodudulation. The subtraction process at this point is given as follows.

$$r = (\sqrt{1-a}\,A + \sqrt{a}\,B) + n - \sqrt{a}\,B \qquad [\text{Math 3}]$$
$$= \sqrt{1-a}\,A + n$$

The above configuration makes it possible to transmit signals for two frames (two signals A and B that are made different in power) in two frames (to transmit signals for three frames in two frame period if the signal of frame 1022 is included), hence enabling transmission via the relay station apparatus without reduction in transmission efficiency.

Non-patent document 1: P. Popovski, E. Carvalho, "Spectrally-Efficient Wireless Relaying based on Superposition Coding, "VTC2007-Spring, April 2007.

DISCLOSURE OF INVENTION

Problems to be Solved by the Invention

The technique described in non-patent document 1 is made possible on the assumption that the signal transmitted from base station apparatus 90 can be received at a certain received power by the terminal apparatus (terminal apparatus 80 that performs communication via relay station apparatus 92). However, under the actual environments, the signal transmitted from base station apparatus 90 is often received at an extremely low power by such a terminal apparatus 80 that is located far away from base station apparatus 90.

In such a case, even if the technique described in non-patent document 1 is used, the received performance of the first frame received by the terminal apparatus are degraded very much, causing the problem that the signal transmitted at the higher power cannot be correctly demodulated, resulting in low transmission efficiency in the whole system.

In view of the above-described problem, it is therefore an object of the present invention to provide a radio communication system and the like which enable efficient communication by transmitting the signal addressed to a terminal apparatus that directly communicates with the base station apparatus and the signal addressed to a terminal apparatus that communicates with the base station apparatus via a relay station apparatus, at the same time by multiplexing the signals.

Means for Solving the Problems

In order to solve the above problem, the radio communication system of the present invention is a radio communication system including a base station apparatus, a relay station apparatus that receives a signal transmitted from the base station apparatus and re-transmits a signal to terminal apparatuses, a first terminal apparatus that directly receives the signal transmitted from the base station apparatus and a second terminal apparatus that receives the signal transmitted from the base station apparatus via the relay station apparatus, and characterized in that the base station apparatus includes: a generating means that generates a signal addressed to the first terminal apparatus and another signal that is different from the signal addressed to the first terminal apparatus and at least includes the second terminal apparatus as the address; a multiplying means that multiplies the signals generated by the generating means by power coefficients to discriminate power between the signals; an adding means that adds up the signals multiplied by the multiplying means; and, a transmitting means that transmits the resultant signal of the signals added by the adding means.

The radio communication system of the present invention is also characterized in that the signal different from the signal addressed to the first terminal apparatus is a signal that is addressed to the second terminal apparatus only.

The radio communication system of the present invention is also characterized in that the multiplying means multiplies power coefficients so that the transmission power of the signal addressed to the first terminal apparatus is high and the transmission power of the signal addressed to the second terminal apparatus is low.

The radio communication system of the present invention is also characterized in that the signal different from the signal addressed to the first terminal apparatus is a broadcast service signal that is transmitted to a large number of terminals.

The radio communication system of the present invention is also characterized in that the multiplying means multiplies power coefficients so that the transmission power of the broadcast service signal is high and the transmission power of the signal addressed to the first terminal apparatus is low.

The radio communication system of the present invention is also characterized in that the base station apparatus further includes a selecting means for selecting a terminal apparatus that can obtain reception quality equal to or higher than a predetermined threshold, as the first terminal apparatus, from a plurality of terminal apparatuses that directly receive the signal transmitted from the base station apparatus.

The radio communication system of the present invention is also characterized in that the relay station apparatus includes: a demodulating means that demodulates the signal addressed to the first terminal apparatus; an extracting means that extracts the signal addressed to the second terminal apparatus, by subtracting the signal demodulated by the demodulating means, from the signal received from the base station apparatus; and, a transmitting means that transmits the signal extracted by the extracting means toward the second terminal apparatus.

The radio communication system of the present invention is also characterized in that the relay station apparatus further includes: an error detecting means that detects an error from the signal addressed to the first terminal apparatus or the signal addressed to the second terminal apparatus; and, a transmission failure signal transmitting means that transmits a signal representing a failure of transmission to the base station apparatus when the error detecting means has detected an error.

The radio communication system of the present invention is characterized in that when having determined that the signal addressed to the first terminal apparatus includes an error, the relay station apparatus further transmits a signal that requests for temporal suspension of multiplexing of two signals to the base station apparatus.

The radio communication system of the present invention is characterized in that when having determined that the signal addressed to the first terminal apparatus does not include an error but the signal addressed to the second terminal apparatus includes an error, the relay station apparatus further transmits a signal that requests for change in transmission power distribution to the base station apparatus.

The radio communication system of the present invention is also characterized in that the relay station apparatus includes: a demodulating means that demodulates the broadcast service signal; and, a transmitting signal that transmits the demodulated broadcast service signal to a large number of terminal apparatuses.

The base station apparatus of the present invention is a base station apparatus connected to a radio communication system including a relay station apparatus that re-transmits a signal received from the base station apparatus toward terminal apparatuses, a first terminal apparatus that directly receives the signal transmitted from the base station apparatus, and a second terminal apparatus that receives the signal transmitted from the base station apparatus via the relay station apparatus, comprising: a generating means that generates a signal addressed to the first terminal apparatus and another signal that is different from the signal addressed to the first terminal apparatus and at least includes the second terminal apparatus as the address; a multiplying means that multiplies the signals generated by the generating means by power coefficients to discriminate power between the signals; an adding means that adds up the signals multiplied by the multiplying means; and, a transmitting means that transmits the resultant signal of the signals added by the adding means.

The relay station apparatus of the present invention is a relay station apparatus connected to a radio communication system including a base station apparatus, a first terminal apparatus that directly receives a signal transmitted from the base station apparatus, and a second terminal apparatus that receives a signal transmitted from the base station apparatus via the relay station apparatus, comprising: a receiving means that receives a signal from the base station apparatus; a demodulating means that demodulates the signal addressed to the first terminal apparatus, from the signal received by the receiving means; an extracting means that extracts the signal addressed to the second terminal apparatus, by subtracting the signal demodulated by the demodulating means, from the signal received by the receiving means; and, a transmitting means that transmits the signal extracted by the extracting means toward the second terminal apparatus.

The relay station apparatus of the present invention is a relay station apparatus connected to a radio communication system including a base station apparatus, a first terminal apparatus that directly receives a signal transmitted from the base station apparatus, and a second terminal apparatus that receives a signal transmitted from the base station apparatus via the relay station apparatus, comprising: a receiving means that receives a signal from the base station apparatus; a demodulating means that demodulates a broadcast service signal addressed to a large number of terminal apparatuses including the second terminal apparatus, from the signal received from the receiving means; and, a transmitting means that transmits the demodulated broadcast service signal to a large number of terminal apparatuses including the second terminal apparatus.

Effect of the Invention

According to the present invention, the base station apparatus sets the transmission power of a signal addressed to the terminal apparatus that directly receives signals from the base station apparatus to be high and the transmission power of a signal addressed to the terminal apparatus that receives signals via the relay station apparatus to be low, adds up the signals and transmits the summed signal. Accordingly, the base station apparatus can multiplex the signal addressed to the terminal apparatus that directly communicates with the base station apparatus at the high power and the signal addressed to the terminal apparatus that communicates via the relay station apparatus at the low power and transmit simultaneously.

According to the present invention, the relay station apparatus receives a signal from the base station apparatus and demodulates the signal addressed to the first terminal apparatus that directly communicates with the base station apparatus, from the received signal. Then, the relay station apparatus extracts the signal addressed to the second terminal apparatus that communicates via the relay station apparatus by subtracting the demodulated signal from the received signal and transmits the extracted signal. Accordingly, the relay station apparatus can appropriately extract the signal to be re-transmitted, from the multiplexed signal from the base station apparatus and transmit the extracted signal to the terminal apparatus.

Provision of the base station apparatus and relay station apparatus thus configured enables transmission of the signals addressed to two terminal apparatuses in a time of two frames, thus making it possible to lowering of transmission efficiency in a system including a relay station.

Figure 1:
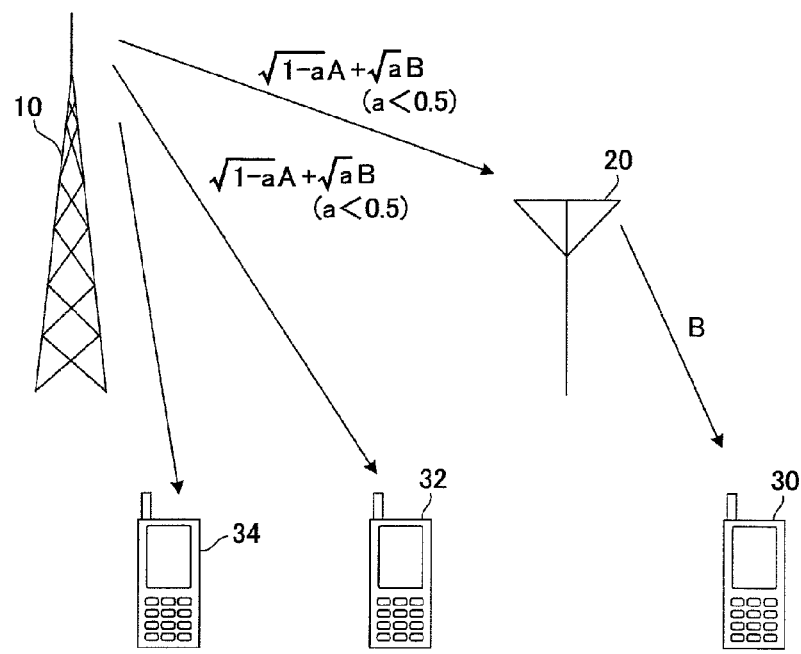
[FIG. 1] is a diagram for illustrating the scheme of a radio communication system in the first embodiment.

| Description of Reference Numerals | |
| --- | --- |
| 10 | base station apparatus |
| 102, 102a, 102b | encoder |
| 104, 104a, 104b | modulator |
| 106, 106a, 106b | power coefficient multiplier |
| 108 | adder |
| 110 | pilot signal inserting unit |
| 112 | D/A converter |
| 114 | radio unit |
| 116 | transmitting antenna unit |
| 130 | receiving antenna unit |
| 132 | radio unit |
| 134 | converter |
| 136 | receiver |
| 138 | terminal selector |
| 20 | relay station apparatus |
| 202 | receiving antenna unit |
| 204 | radio unit |
| 206 | A/D converter |
| 208 | channel estimator |
| 210 | channel compensator |
| 212 | demodulator |
| 214 | decoder |
| 216 | encoder |
| 218 | modulator |
| 220 | power coefficient multiplier |
| 222 | subtractor |
| 224 | demodulator |
| 226 | decoder |
| 228 | encoder |
| 230 | modulator |
| 232 | pilot signal inserting unit |
| 234 | D/A converter |
| 236 | radio unit |
| 238 | transmitting antenna unit |
| 250, 254 | error detector |
| 252 | controller |
| 260 | switcher |
| 30, 32, 24 | terminal apparatus |
| 302 | receiving antenna unit |
| 304 | radio unit |
| 306 | A/D converter |
| 308 | channel estimator |
| 310 | channel compensator |
| 312 | demodulator |
| 314 | decoder |
| 330 | transmitter |
| 332 | converter |
| 334 | radio unit |
| 336 | transmitting antenna unit |
| 350 | encoder |
| 352 | modulator |
| 354 | power coefficient multiplier |
| 356 | subtractor |
| 358 | demodulator |
| 360 | decoder |

BEST MODE FOR CARRYING OUT THE INVENTION

The best embodiments in a radio communication system when the present invention is applied will be described with reference to the drawings.

The First Embodiment

Figure 2:
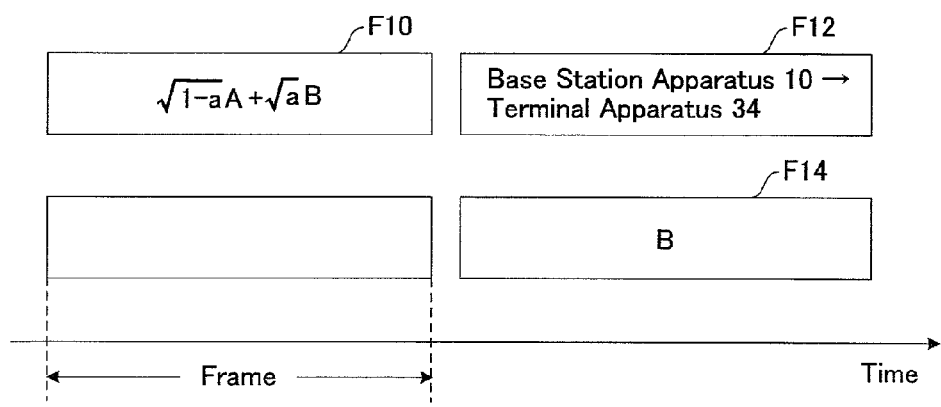
[FIG. 2] is a diagram schematically showing communication frames in the first embodiment.

To begin with, the scheme of a radio communication system to which the present invention is applied will be described using the drawings. FIG. 1 is a diagram for illustrating the whole radio communication system. FIG. 2 is a diagram schematically showing frames to be communicated. Here, the two frames on the upper side of FIG. 2 represent the frames to be transmitted from a base station apparatus while the two frames on the lower side of FIG. 2 (the frame shown by the broken line is not transmitted) represent the frames to be transmitted from a relay station apparatus.

As shown in FIG. 1, the radio communication system has a base station apparatus 10, a relay station apparatus 20 and terminal apparatuses 30, 32 and 34 disposed therein.

In the present embodiment, a method of preventing lowering of transmission efficiency by multiplexing the signals addressed to two different terminal apparatuses when signals are multiplexed using superposition coding at base station apparatus 10. Here, since a frame F12 in FIG. 2 may be used to perform communication between the base station apparatus and the terminal apparatus, the drawing also illustrates this transmission. However, the communication associated with this frame is not particularly relevant to the present invention, so that the description is omitted.

As shown in FIG. 1, in the relay system in the present embodiment, the signals to be multiplexed using superposition coding at the base station apparatus, are set up as a signal addressed to a terminal apparatus 32 that performs direct communication with base station apparatus 10, and as a signal addressed to a terminal apparatus 30 that performs communication via a relay station apparatus 20, and transmitted. Here, description will be given on the assumption that the signal transmitted from base station apparatus 10 can hardly be received at terminal apparatus 30.

Figure 17:
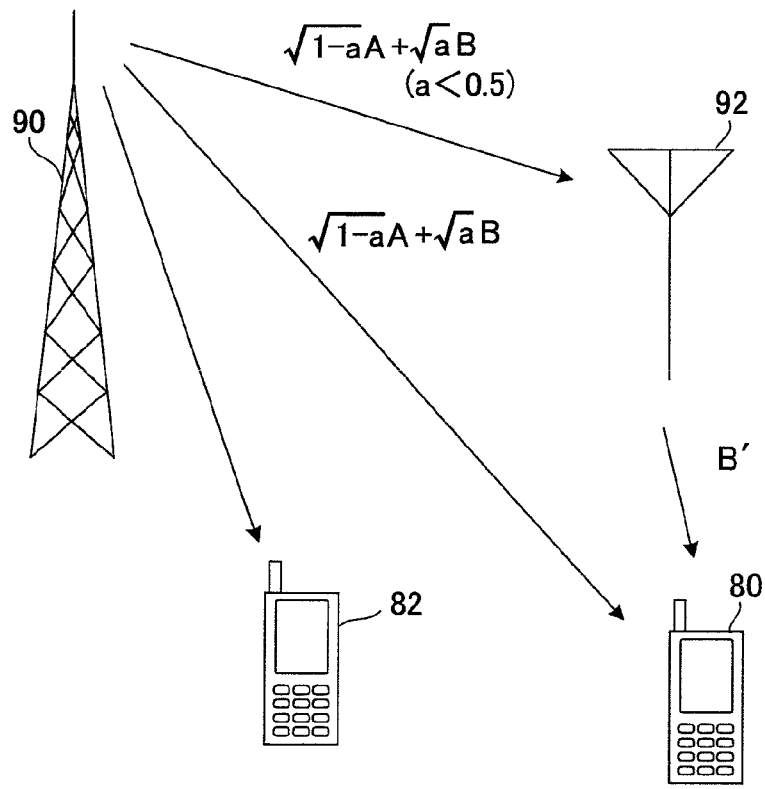
[FIG. 17] is a diagram for illustrating a conventional radio communication system.
Figure 18:
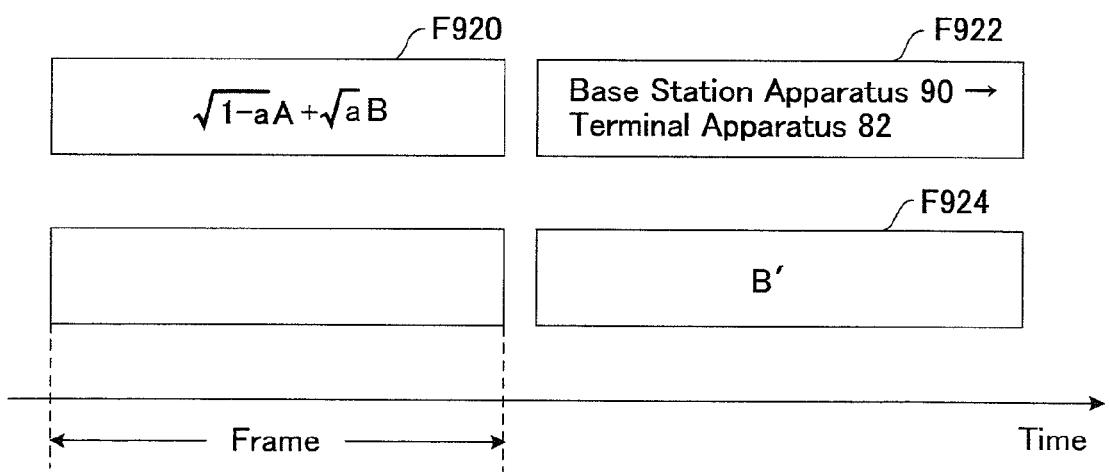
[FIG. 18] is a diagram for illustrating a conventional radio communication system.

At this time, base station apparatus 10 is configured such that a signal A addressed to terminal apparatus 32 is transmitted at the higher power while a signal B addressed to terminal apparatus 30 is transmitted at the lower power. Since in the conventional system shown in FIG. 17, both the signals are addressed to terminal apparatus 80, there is no need to consider the power distribution, that is, which signal should be allocated with the higher power. However, when the signals addressed to different terminal apparatuses are multiplexed as in the present embodiment, power distribution is very important.

As described above, the transmission power of signal A addressed to terminal apparatus 32 that directly communicates with base station apparatus 10 is set higher whereas the transmission power of signal B addressed to terminal apparatus 30 that communicates via relay station apparatus 20 is set lower. Then, when the base station apparatus transmits the multiplexed result of the signals in frame F10, terminal apparatus 32 receiving the signal receives signal A addressed to itself at the higher power. As a result, terminal apparatus 32 can demodulate signal A addressed to itself.

At this time, the multiplexed signal or signal B addressed to terminal apparatus 30 gives interference. However, since the power is set low, the reception performance of terminal apparatus 32 will not be degraded very much.

The signal transmitted from base station apparatus 10 is also received by relay station apparatus 20. Relay station apparatus 20, handling signal B (that is set at the lower transmission power) addressed to terminal apparatus 30 as interference, demodulates signal A (that is set at the higher transmission power) addressed to terminal apparatus 32.

Subsequently, after re-modulation of the demodulated result, the product of the signal re-multiplied by the square root of (1−a) that represents the power distribution multiplied at base station apparatus 10 is subtracted from the received signal, so that a signal including signal B addressed to terminal apparatus 30 and noise is extracted. However, it is noted that variations in received power due to distance decay and/or shadowing need to be considered and calculated at the time of compensating channel variation or at the time of re-modulation.

At this time, the value of 'a' is known between base station apparatus 10 and relay station apparatus 20. In relay station apparatus 20, signal B addressed to terminal apparatus 30 is demodulated after removal of signal A addressed to terminal apparatus 32 in the above way. Then, the demodulated result is used to re-modulate signal B addressed to terminal apparatus 30 so that the re-modulated result is transmitted to terminal apparatus 30 in frame F14 in FIG. 2, for example. In this way, the signal B that is transmitted to relay station apparatus 20 is received and demodulated by terminal apparatus 30.

With the above configuration, it is possible to transmit the signals of two frames (two signals A and B made different in power) by two frames. Accordingly, even in the situation where the signal transmitted from base station apparatus 10 cannot be received by terminal apparatus 30, it is possible to prevent the transmission efficiency of the whole relay system from lowering in such a manner that the signals multiplexed by superposition coding are allocated to those addressed to different terminal apparatuses.

Figure 3:
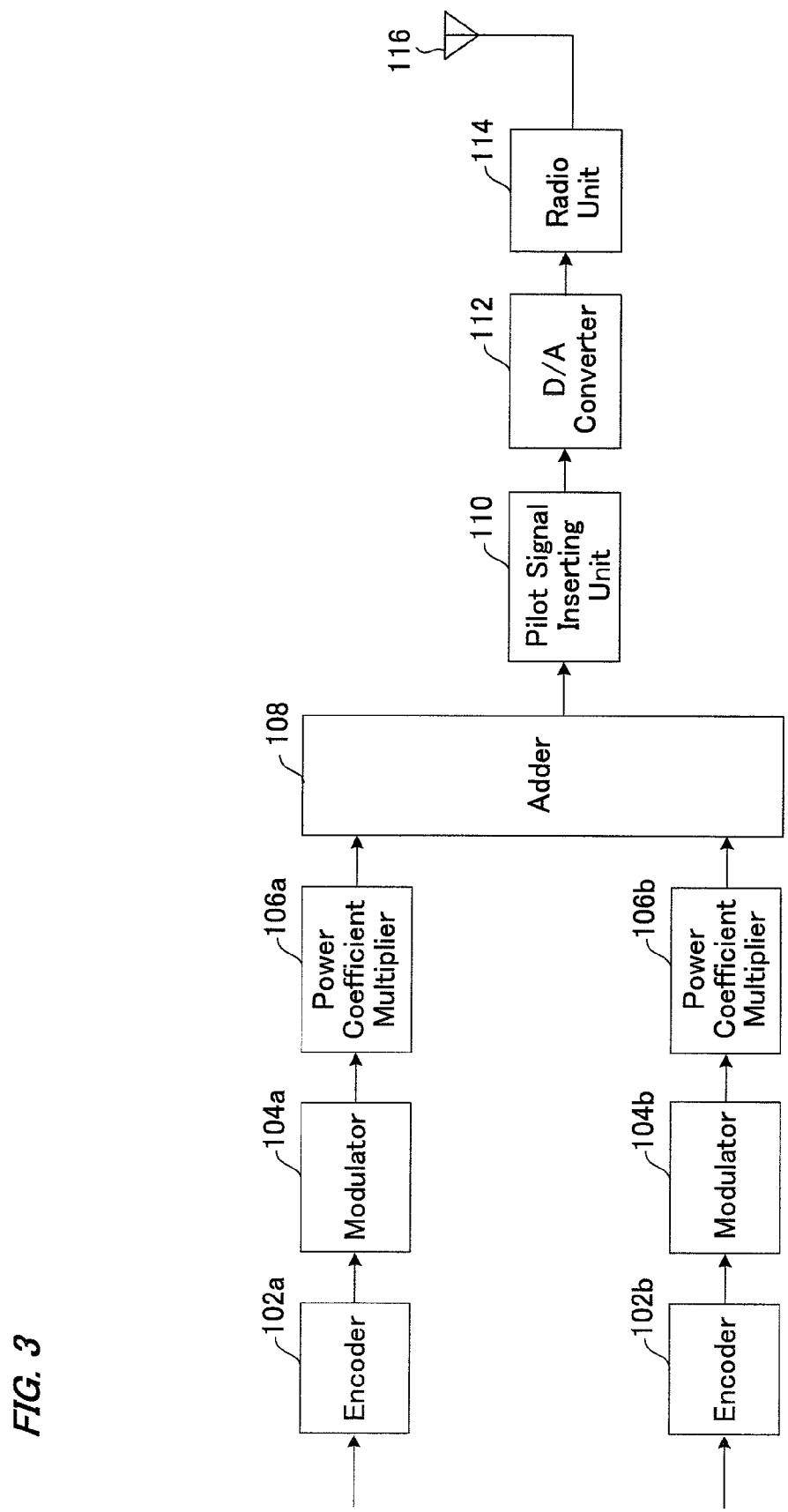
[FIG. 3] is a diagram for illustrating the functional configuration of a base station apparatus in the first embodiment.

Next, the configuration of base station apparatus 10 in the present embodiment will be described. As shown in FIG. 3, base station apparatus 10 includes encoders 102 (102a, 102b), modulators 104 (104a, 104b), power coefficient multipliers 106 (106a, 106b), an adder 108, a pilot signal inserting unit 101, a D/A converter 112, a radio unit 114 and a transmitting antenna unit 116.

In base station apparatus 10, first of all, encoders 102 perform error correction encoding of data to be transmitted. In base station apparatus 10 in the present embodiment, encoder 102a encodes data addressed to the terminal apparatus (terminal apparatus 32) that directly communicates with base station apparatus 10 while encoder 102b encodes data addressed to the terminal apparatus (terminal apparatus 30) that performs communication via relay station apparatus 20.

The outputs from encoders 102 are sent to respective modulators 104 and modulated. Then, in power coefficient multipliers 106, the results are multiplied by respective coefficients ('a' in Eq. (1) and the like) for adjusting transmission power, then added up.

At this time, the square root of (1−a) is multiplied in power coefficient multiplier 106a, whereas the square root of 'a' is multiplied in power coefficient multiplier 106b. In this way, the signal addressed to terminal apparatus 32 that directly communicates with base station apparatus 10 is adjusted to present the higher power while the signal addressed to terminal apparatus 30 that communicates via relay station apparatus 20 is adjusted to be transmitted at the lower power.

These two signals are added up at adder 108, then a known pilot signal for channel estimation is inserted at pilot signal inserting unit 110, and the resultant is converted into the analog signal at D/A converter 112. Then, after conversion into a transmittable frequency at radio unit 114, the signal is transmitted from transmitting antenna unit 116. With this configuration, it is possible to multiplex the signal addressed to terminal apparatus 32 that directly communicates with base station apparatus 10 and the signal addressed to terminal apparatus 30 that communicates via relay station apparatus 20 in an appropriate power ratio and transmit the multiplexed signal.

Figure 4:
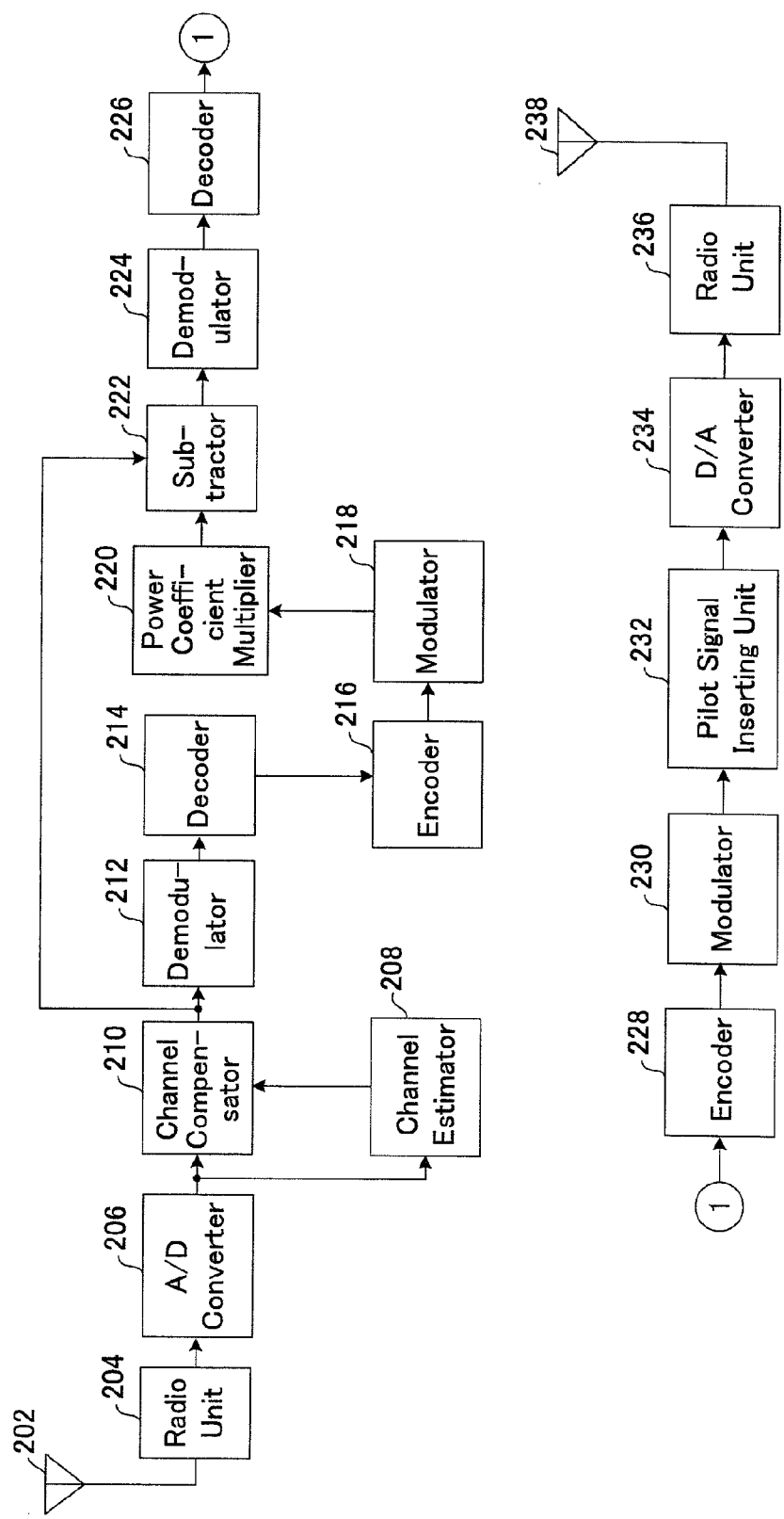
[FIG. 4] is a diagram for illustrating the functional configuration of a relay station apparatus in the first embodiment.

Next, the apparatus configuration of relay station apparatus 20 in the present embodiment will be described with reference to FIG. 4. As shown in FIG. 4, relay station apparatus 20 of the present embodiment includes an antenna unit 202, radio units 204, 236, an A/D converter 206, a channel estimator 208, a channel compensator 210, demodulators 212, 224, decoders 214, 226, encoders 216, 228, modulators 218, 230, a power coefficient multiplier 220, a subtractor 222, a pilot signal inserting unit 232, a D/A converter 234 and a transmitting antenna unit 238.

The signal transmitted from base station apparatus 10 is received by receiving antenna unit 202 of this relay station apparatus 20, converted into an A/D convertible frequency by radio unit 204, then converted from analog signals to digital signals by A/D converter 206.

After A/D conversion, the pilot signal for channel estimation, inserted at base station apparatus 10, is sent to channel estimator 208, where a channel estimating process using the known signal between base station apparatus 10 and relay station apparatus 20 is executed.

Further, the data signal is sent with the estimated channel value calculated at channel estimator 208 to channel compensator 210, where a process for compensating channel variations is executed. The signal with channel variations compensated is demodulated at demodulator 212 so that the transmitted data is regenerated at decoder 214. In relay station apparatus 20 in the present embodiment, this demodulating process is performed for the signal addressed to terminal apparatus 32 that directly communicates with base station apparatus 10 (the signal transmitted at the higher transmission power) while the signal addressed to terminal apparatus 30 that communicates via this relay station apparatus 20 (the signal transmitted at the lower transmission power) is handled as interference.

The signal thus regenerated by the above process (the signal addressed to terminal apparatus 32 that directly communicates with base station apparatus 10) is encoded and modulated at encoder 216 and modulator 218 in the same way as done in base station apparatus 10. Then, the resultant is multiplied by the same coefficient (square root of (1−a)), which is used to multiply at base station apparatus 10 by power coefficient multiplier 220. The output from this power coefficient multiplier 220 is the same signal as the output from power coefficient multiplier 106a in FIG. 3, and sent to subtractor 222.

Subtractor 222 performs a process of subtracting the output from power coefficient multiplier 220 from the signal after channel compensation. This subtraction process enables the extraction of the signal addressed to terminal apparatus 30 that communicates with relay station apparatus 20, from the received signal. The thus extracted signal is demodulated at demodulator 224 so that the transmitted data is regenerated at demodulator 226.

The thus regenerated, signal addressed to terminal apparatus 30 that communicates via relay station apparatus 20, is encoded and modulated at modulator 230 in the same way as done in base station apparatus 10, and added with a pilot signal for channel estimation at pilot signal inserting unit 232. This pilot signal may be the same as, or different from, that used at base station apparatus 10 as long as it is known between relay station apparatus 20 and the terminal apparatus.

Then, the output from pilot signal inserting unit 232 is converted into the analog signal at D/A converter 234. Then, after being converted into a transmittable frequency at radio unit 236, the signal is transmitted from antenna unit 238 to terminal apparatus 30. With this configuration, it is possible to extract the signal addressed to the terminal apparatus that communicates via the relay station apparatus by removing the signal addressed to terminal apparatus 32 that directly communicates with base station apparatus 10 from the multiplexed signal, which is of the signal addressed to two different terminal apparatuses, and re-transmit the signal addressed to the terminal apparatus.

Figure 5:
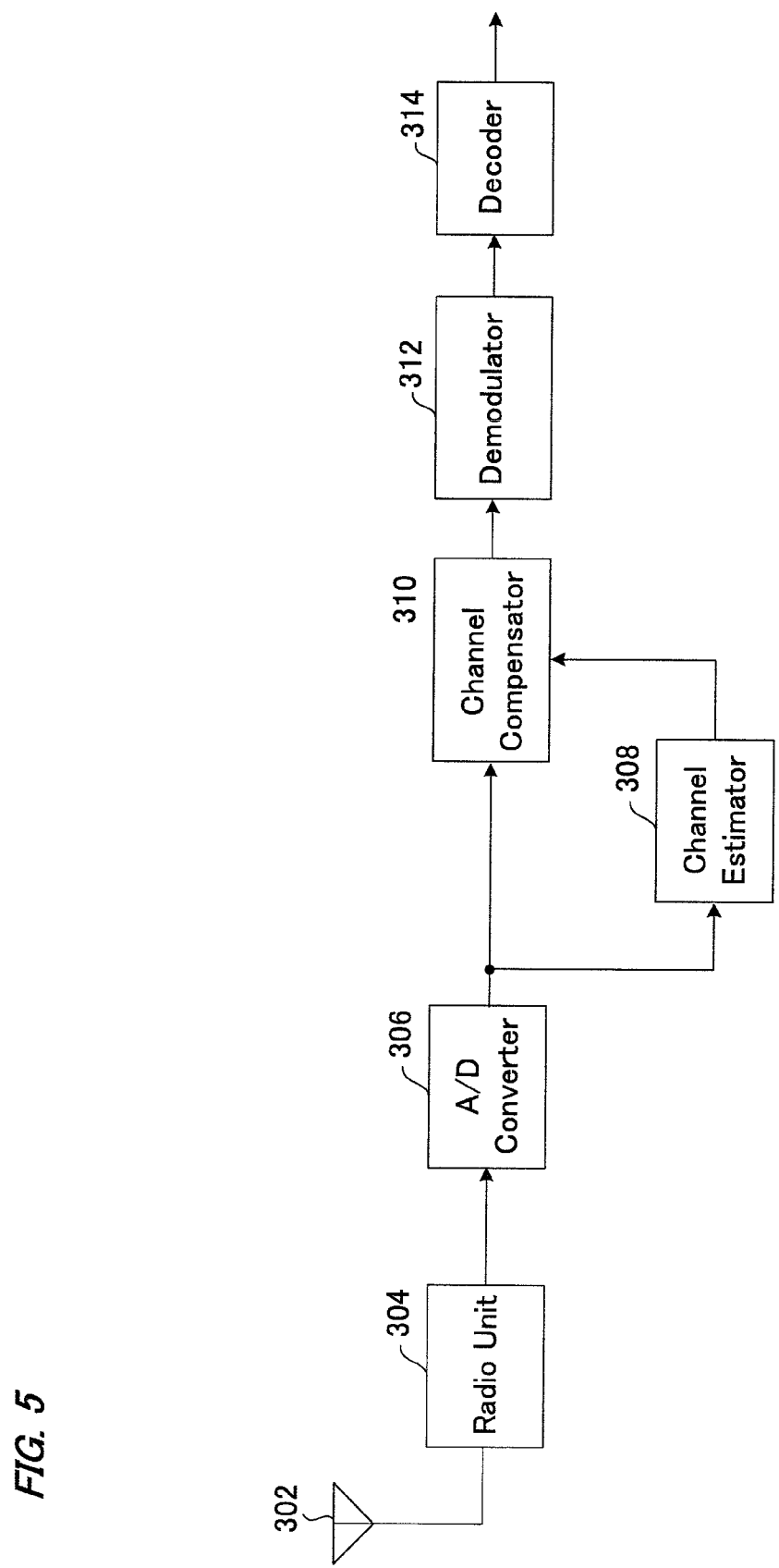
[FIG. 5] is a diagram for illustrating the functional configuration of a terminal apparatus in the first embodiment.

Next, FIG. 5 shows the configuration of terminal apparatus 30 as one example of a terminal apparatus. FIG. 5 is a diagram mainly showing the receiver in terminal apparatus 30.

As shown in FIG. 5, terminal apparatus 30 includes a receiving antenna unit 302, a radio unit 304, an A/D converter 306, a channel estimator 308, a channel compensator 310, a demodulator 312 and a decoder 314. This configuration is common in the configurations of terminal apparatus 30 and terminal apparatus 32.

The signal transmitted from base station apparatus 10 or relay station apparatus 20 is received by antenna unit 302. Then, after being converted into an A/D convertible frequency at radio unit 304, the received signal is converted from the analog signal to the digital signal by A/D converter 306.

After A/D conversion, the pilot signal for channel estimation inserted on the transmitting side (base station apparatus 10 or relay station apparatus 20) is sent to channel estimator 308, where channel estimation using a known signal is performed. The data signal is sent together with the estimated channel value calculated at channel estimator 308 to channel compensator 310, where a process for compensating channel variations is carried out.

The signal compensated for channel variations is demodulated at demodulator 312 so that the transmitted data is regenerated at decoder 314. When the transmitted signal transmitted from base station apparatus 10 is directly received by terminal apparatus 32 having the above-described receiver, the multiplexed signal addressed to terminal apparatus 30 that performs communication via relay station apparatus 20 is handled as interference. However, since the power difference was given at base station apparatus 10, it is possible to perform demodulation without seriously degrading reception performance.

With the above apparatus configuration, it is possible in base station apparatus 10 to multiplex the signal addressed to terminal apparatus 32 that directly communicates with base station apparatus 10 and the signal addressed to terminal apparatus 30 that communicates via relay station apparatus 20, using superposition coding while it is possible in relay station apparatus 20 to extract the appropriately addressed signal and retransmit the signal. In the radio communication system including these apparatuses, it is possible to prevent lowering of transmission efficiency of the whole system under a situation in which the signal transmitted from base station apparatus 10 cannot be received by terminal apparatus 30.

As described above, in terminal apparatus 32, the signal addressed to the terminal apparatus (terminal apparatus 30) that communicates via relay station apparatus 20 is observed as interference. In order to keep favorable reception performance under the situation where this interference exists, it is important to select the terminal apparatus that can assure as high an SNR as possible among several terminal apparatuses that directly communicate with base station apparatus 10 and multiplex its signal with the signal that is addressed to the terminal apparatus that communicates via relay station apparatus 20, by using superposition coding. An appropriate section of a terminal apparatus can be realized by providing the terminal apparatus and the base station apparatus in a configuration shown in FIGS. 6 and 7.

Figure 6:
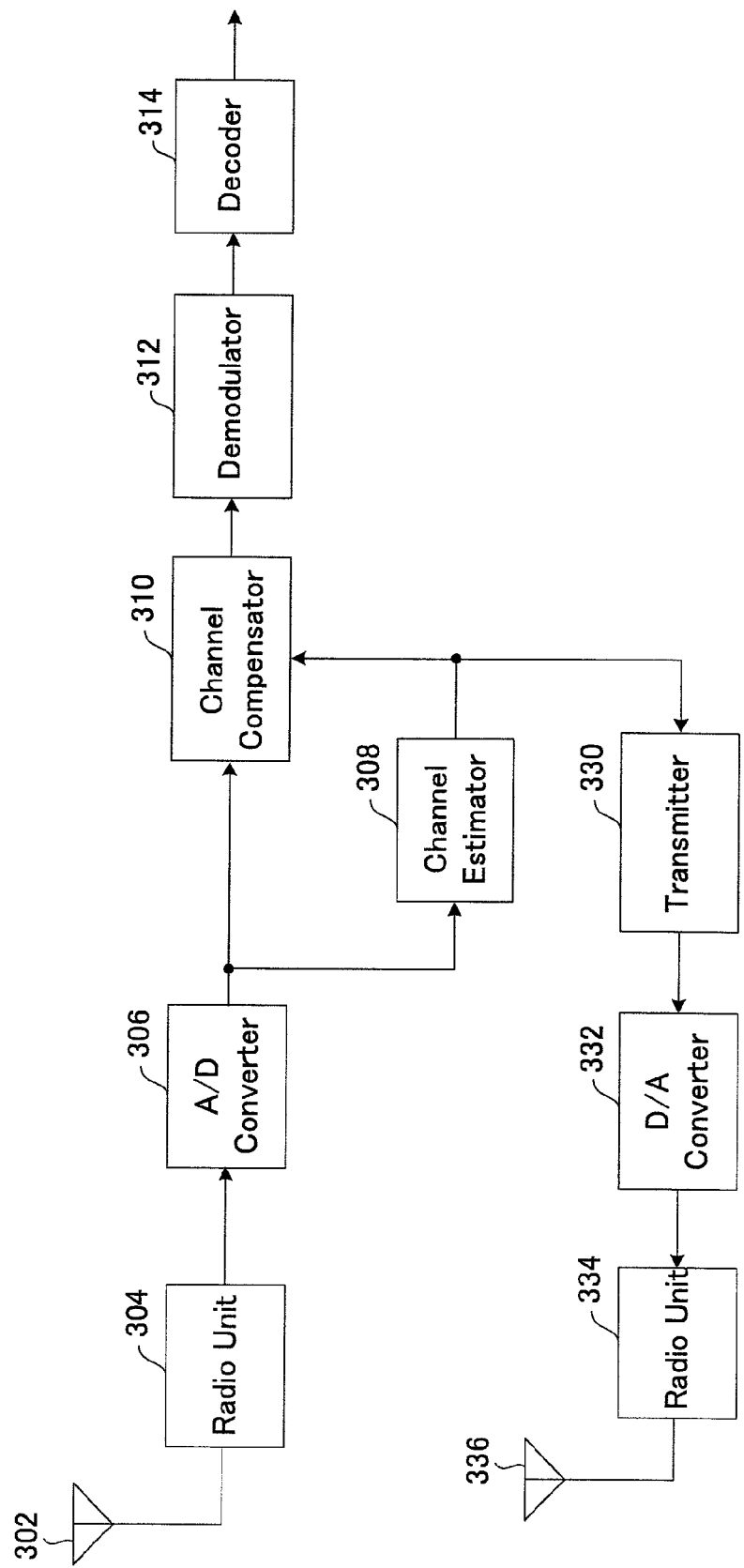
[FIG. 6] is a diagram for illustrating the functional configuration of a terminal apparatus in the first embodiment.

Terminal apparatus shown in FIG. 6 is the configuration shown in FIG. 5 to which a transmitter 330, a D/A converter 332, a radio unit 334 and a transmitting antenna unit 336 are added. The transmitting system of these has the function of feeding back the estimated channel value calculated at channel estimator 308 as an indicator representing reception quality to base station apparatus 10.

With this arrangement, it is possible for each terminal apparatus, in particular, terminal apparatus 32 that directly communicates with base station apparatus 10, to feed back the reception quality when receiving the signal transmitted from base station apparatus 10. Though the estimated channel value is used to feed back as the indicator representing reception quality, RSSI (Received Signal Strength Indicator) that is the measurement of the level of the output signal from radio unit 304 may also be used for feedback.

Figure 7:
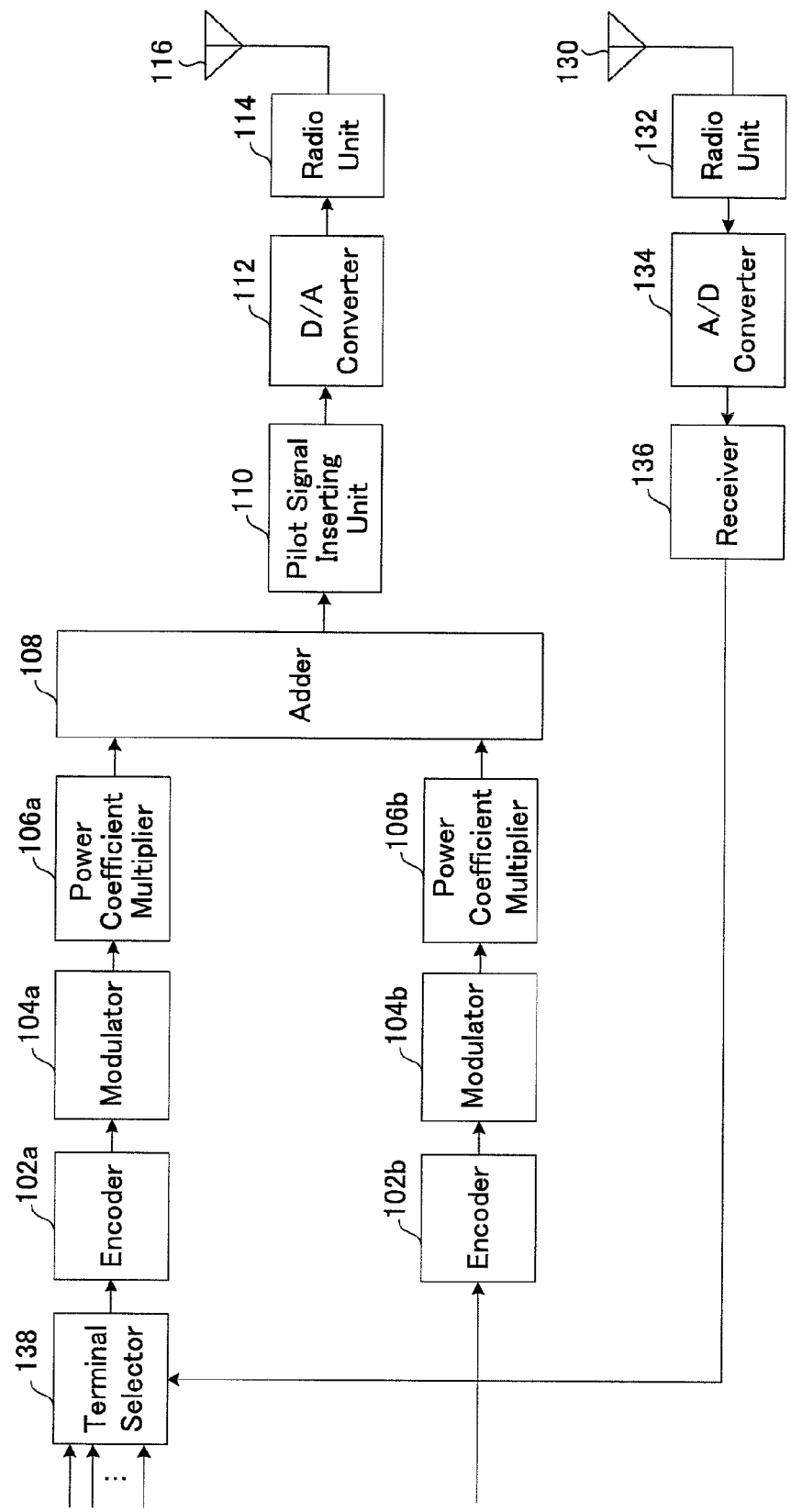
[FIG. 7] is a diagram for illustrating the functional configuration of a base station apparatus in the first embodiment.

Further, the base station apparatus shown in FIG. 7 is the configuration shown in FIG. 3 to which a receiving antenna unit 130, a radio unit 132, an A/D converter 134, a receiver 136 and a terminal selector 138 are added.

In the reception system of receiver 136 from receiving antenna unit 130, the information representing the reception quality fed back from each terminal apparatus is received and reproduced. Then, the information representing the reception quality of each terminal apparatus is sent to terminal selector 138, so that the terminal apparatus that can achieve reception at the highest SNR among the terminal apparatuses which perform direct communication with base station apparatus 10 is selected, and the signal addressed to the selected terminal apparatus is multiplexed by superposition coding with the signal addressed to the terminal apparatus that communicates via relay station apparatus 20.

Instead of selecting the terminal apparatus which can obtain the highest SNR, it is possible to use a technique of selecting one terminal apparatus from the terminal apparatuses that can obtain an SNR equal to or greater than the predetermined threshold.

The arrangement of these terminal apparatuses and base station apparatus enables selection of a terminal apparatus that assures as high an SNR as possible from several terminal apparatuses that directly communicate with the base station apparatus, and can provide favorable reception performance when multiplexing with the signal addressed to another terminal apparatus, by superposition coding.

Alternatively, the multiplexing of the present embodiment maybe performed only when the signal transmitted from the base station apparatus can be received by the relay station apparatus, in a reception quality equal to or better than the predetermined threshold.

The Second Embodiment

Next, the second embodiment will be described. Usually, the base station apparatus and relay station apparatus are installed at relatively high positions so as to be able to secure an unobstructed view. Accordingly, it is often possible to secure stable communication quality therebetween. However, depending on the deployed position of the relay station apparatus or change in the ambient environment, there are some cases in which a stable communication quality cannot be assured between the base station apparatus and the relay station apparatus. In such the situation, the present embodiment shows the control of errors occurred when the signal transmitted from the base station apparatus is demodulated at the relay station apparatus.

Figure 8:
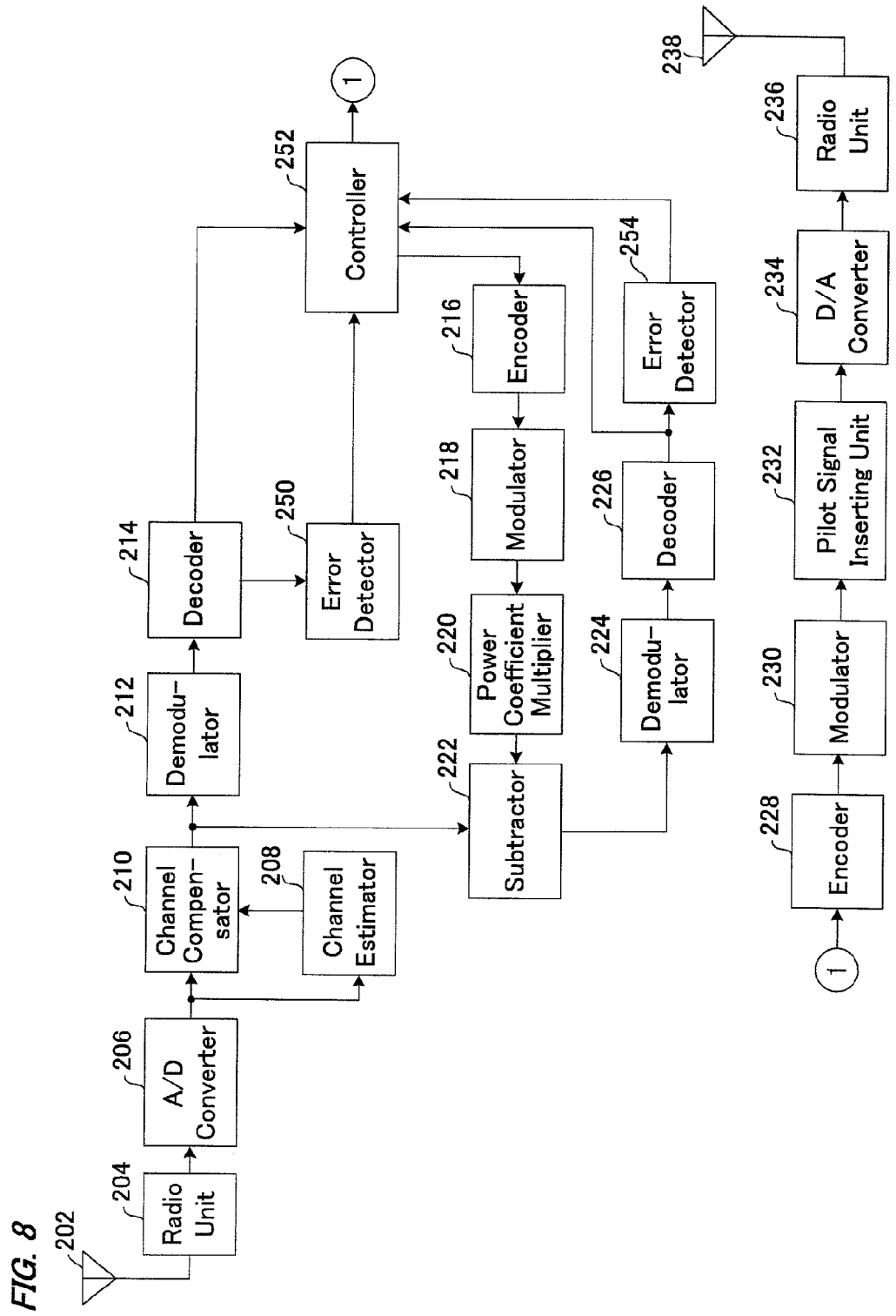
[FIG. 8] is a diagram for illustrating the functional configuration of a relay station apparatus in the second embodiment.
Figure 9:
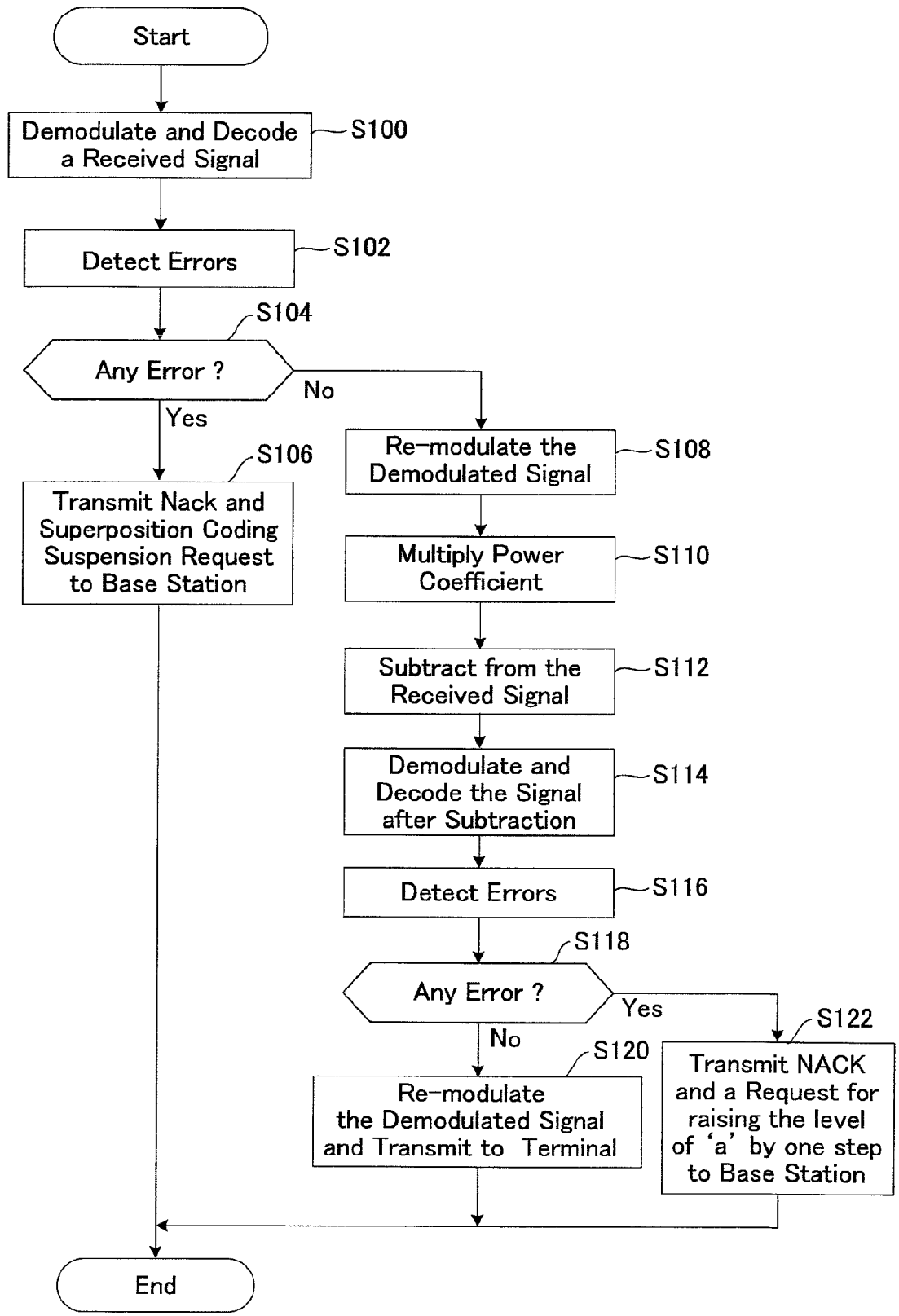
[FIG. 9] is an operational flow for explaining the process of a relay station apparatus in the second embodiment.

FIGS. 8 and 9 show an apparatus configuration of a relay station apparatus 25 and a control flow of relay station apparatus 25 in the present embodiment. Here, the common components of relay station apparatus 25 of the present embodiment with those of relay station apparatus 20 are allocated with the same reference numerals and the detailed description is omitted.

As shown in FIG. 8, relay station apparatus 25 of the present embodiment is the relay station apparatus shown in FIG. 4 to which error detectors 250, 254 and a controller 252 are added. In the present embodiment, the two signals (A and B in FIG. 1) transmitted from base station apparatus 10 are added with error detecting signals, respectively, so that error detectors 250 and 254 check (CRC: Cyclic Redundancy Check) on whether the decoded result includes errors, based on the added signals.

In this case, error detector 250 makes a check on the signal transmitted at the higher power while error detector 254 makes a check on the signal transmitted at the lower power. These check results and the associated decoded results are transmitted to controller 252 so as to perform control as to re-transmission.

The control of this re-transmission will be described with reference to FIG. 9. First, the received signal is demodulated and decoded (Step S100). Then, error detection of the decoded signal is performed (Step S102). This error detection is carried out at error detector 250.

As a result, if an error is detected (Step S104; Yes), this means a channel condition under which even the signal transmitted at the higher power cannot be correctly received so that NACK (Negative ACKnowledgement) representing that transmission has failed is transmitted to the base station apparatus (Step S106).

At this time, a request for transmission of the next frame without use of superposition coding should also be notified to the base station apparatus. The information of these notices is generated at controller 252 and transmitted to base station apparatus 10 by the transmitting system downstream of encoder 228. With this control, it is possible to temporarily suspend the multiplexing process of two different signals and reduce occurrence of errors when the channel condition between base station apparatus 10 and relay station apparatus 25 is extremely poor.

On the other hand, at Step S102, if it is determined that there is no error (Step S104; No), the signal demodulated and decoded at Step S100 is re-modulated (Step S108). Then, the result is multiplied by the same power coefficient as multiplied at base station apparatus 10 (Step S110), and the process of subtraction form the received signal is performed (Step S112). Here, in the same as the first embodiment, it is assumed that the operation is performed taking into account variations in received power due to distance decay and/or shadowing.

Then, demodulation and decoding processes for the output signal after subtraction at Step S112 are carried out (Step S114). The process of Steps S108 to S114 is the same as that in the first embodiment.

Next, error detection on the thus decoded signal is made by error detector 254 (Step S116). When it is determined that there is no error (Step S118; No), the signal demodulated and decoded at Step S108 is re-modulated and transmitted toward the terminal apparatus (Step S129). On the other hand, when an error is detected (Step S118; Yes), this means no poor channel conditions under which the signal transmitted at the higher power can be correctly modulated, even though the signal transmitted at the lower power gives an error due to influence of noise. Accordingly, NACK and a request for increasing the transmission power for the signal with error by the predetermined step are transmitted to the base station apparatus 10 (Step S122).

The information of these notices is generated at controller 252 and transmitted to base station apparatus 10 by the transmitting system downstream of encoder 228. When receiving a request for raising the transmission power of the signal addressed to the terminal apparatus that communicates via relay station apparatus 25 (the signal transmitted at the lower power), base station apparatus 10 decreases, in the next frame, the transmission power for the signal addressed to the terminal apparatus that directly communicates with the base station apparatus, by one step, and increases the transmission power for the signal addressed to the terminal apparatus that communicates via the relay station apparatus, by one step.

When receiving NACK from the terminal apparatus that directly communicates with base station apparatus 10, the base station apparatus performs a process of resetting the transmission powers for the two signals to be multiplexed to the predetermined regular levels. This control enables re-transmission in accordance with the transmission condition between base station apparatus 10 and relay station apparatus 25, hence making it possible to prevent lowering of transmission efficiency due to occurrence of reception errors.

The Third Embodiment

The above first and second embodiments were described taking examples in which the signals addressed to two different terminal apparatuses are multiplexed by superposition coding. The present embodiment shows an example in which the signal addressed to a particular terminal apparatus and a broadcast service for an unspecified large number of terminal apparatuses in the cell (MBMS: Multimedia Broadcast Multicast Service) are multiplexed.

Figure 10:
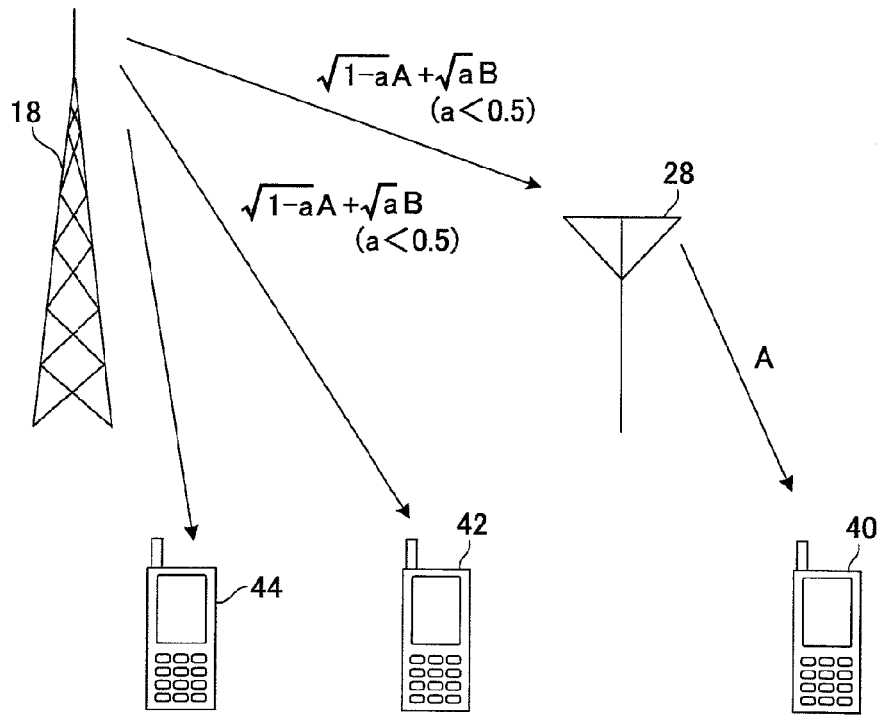
[FIG. 10] is a diagram for illustrating the scheme of a radio communication system in the third embodiment.
Figure 11:
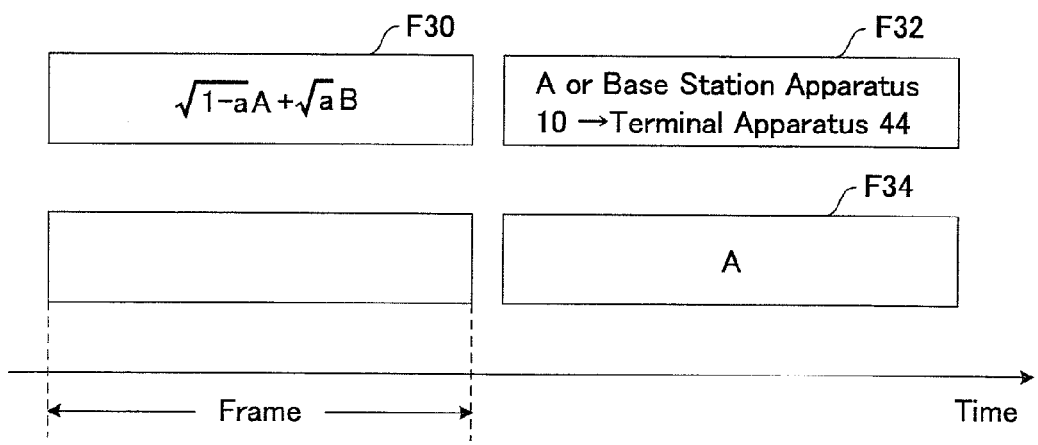
[FIG. 11] is a diagram schematically showing communication frames in the third embodiment.

FIG. 10 shows the outline of a radio communication system in the present embodiment and FIG. 11 shows the relationship between transmission frames. As shown in FIG. 10, this is a radio communication system including a base station apparatus 18 and a relay station apparatus 28, to which a terminal apparatus 40, terminal apparatus 42 and terminal apparatus 44 are connected.

The radio communication system shown in FIG. 10 is a system similar to the first embodiment shown in FIG. 1, but the signals to be multiplexed are different such that a signal A to be transmitted at the higher power is the signal for MBMS and a signal B to be transmitted at the lower power is the signal addressed to a terminal apparatus (terminal apparatus 42) that directly communicates with base station apparatus 18.

In this case, differing from the first embodiment, relay station apparatus 28 transmits MBMS (signal A) that is set at the higher transmission power to terminal apparatuses (frame F34) in order that even a terminal apparatus located away from base station apparatus 18 can receive MBMS.

On the other hand, in order to obtain both MBMS and the signal (signal B) addressed to itself, terminal apparatus 42 demodulates MBMS first, then demodulates the signal addressed to itself. Specifically, as shown in FIG. 11, the signal A or MBMS is demodulated from the signal received in frame F30 as shown in FIG. 11. Then, after re-modulation of this signal, the resultant is subtracted from the received signal so as to extract signal B (the signal addressed to terminal apparatus 42). When the thus extracted signal B is demodulated, MBMS and the data for the individual terminal can be received and demodulated.

Base station apparatus 18 in the present embodiment can re-transmit MBMS at the same timing when relay station apparatus 28 transmits MBMS. As a result, the terminal apparatus that is located at the boundary between the range in which direct communication with base station apparatus 18 is performed and the range in which communication is performed via relay station apparatus 28, can receive the combined signal of the same (MBMS) signals transmitted separately from two transmitting sources (base station apparatus 18 and relay station apparatus 28) and combined on the channel, hence making it possible to improve reception quality. Differing from this, another signal (e.g., signal addressed to terminal apparatus 44) may also be transmitted in frame F32.

Figure 12:
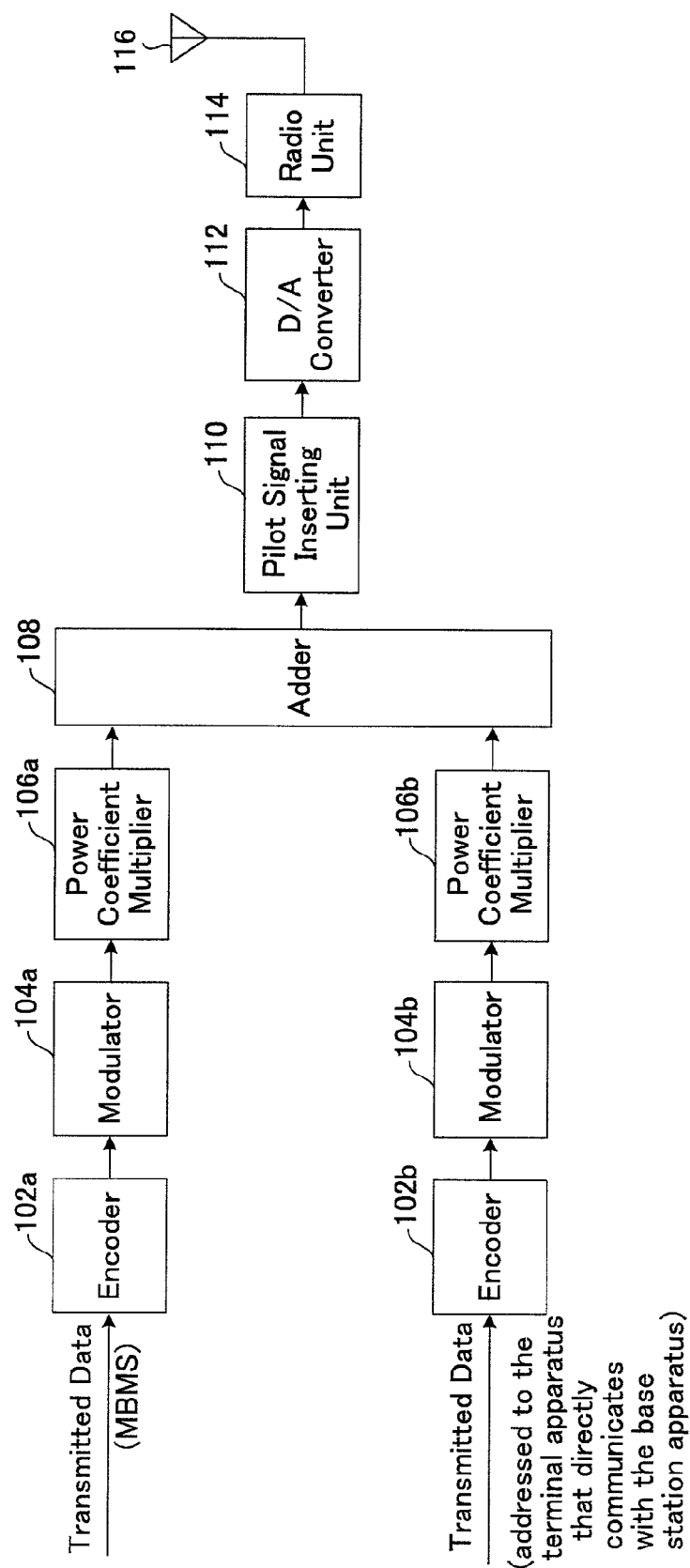
[FIG. 12] is a diagram for illustrating the functional configuration of a base station apparatus in the third embodiment.
Figure 13:
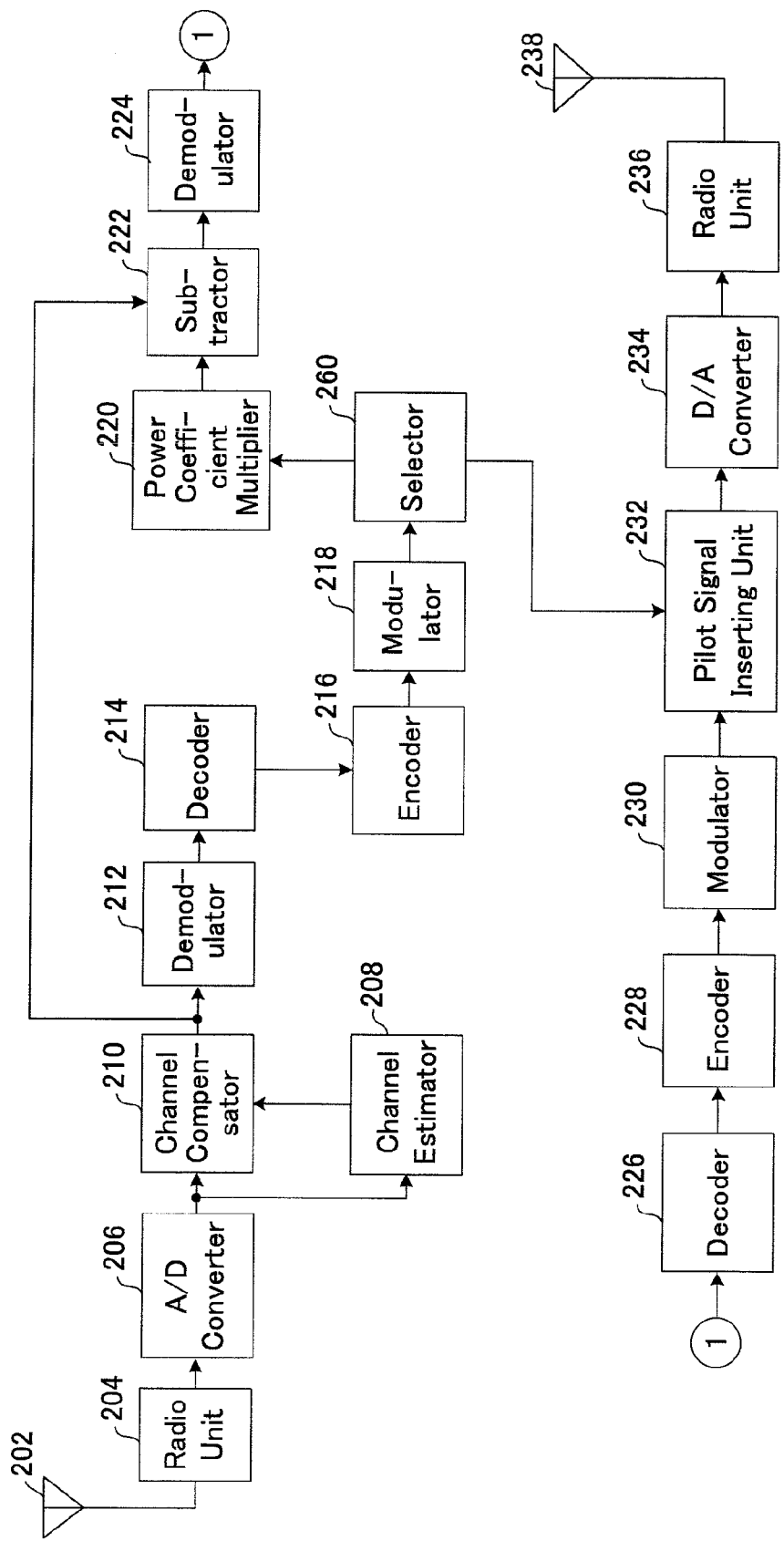
[FIG. 13] is a diagram for illustrating the functional configuration of a relay station apparatus in the third embodiment.
Figure 14:
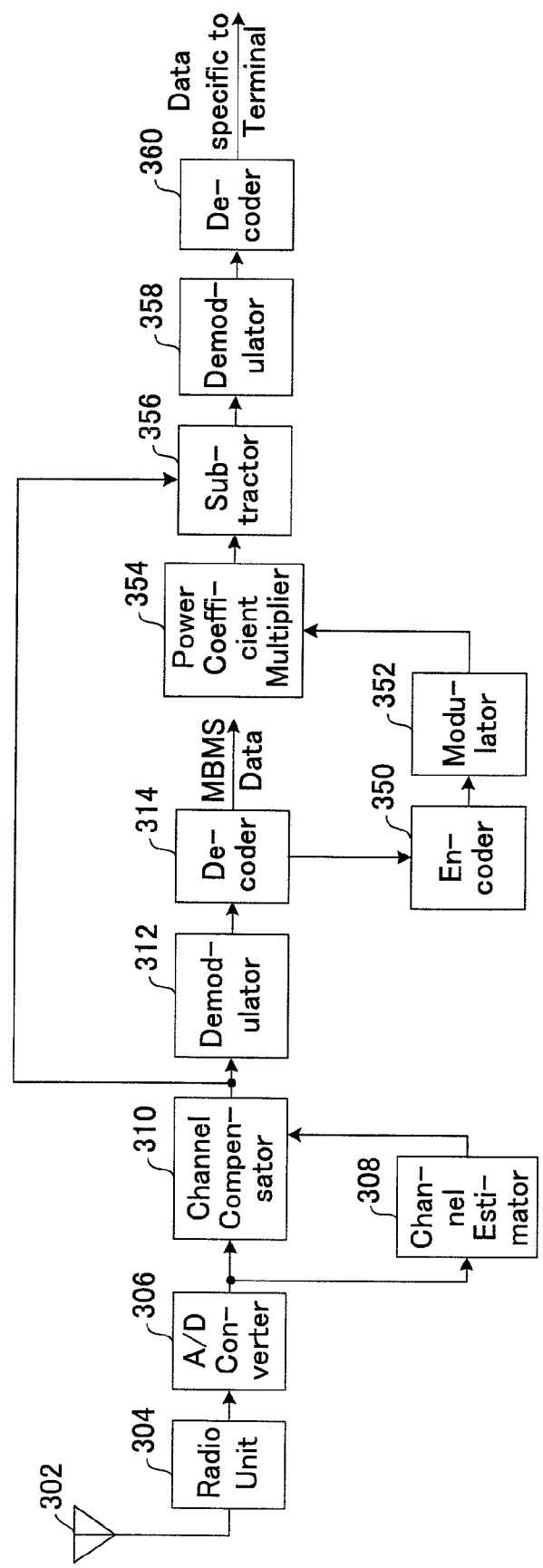
[FIG. 14] is a diagram for illustrating the functional configuration of a terminal apparatus in the third embodiment.
Figure 15:
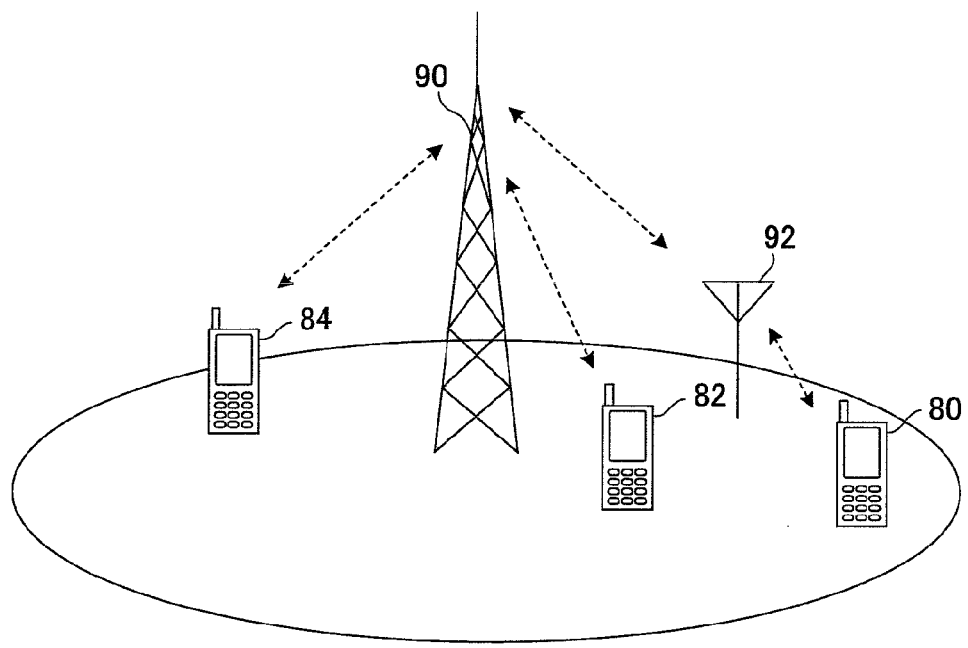
[FIG. 15] is a diagram for illustrating a conventional radio communication system.
Figure 16:
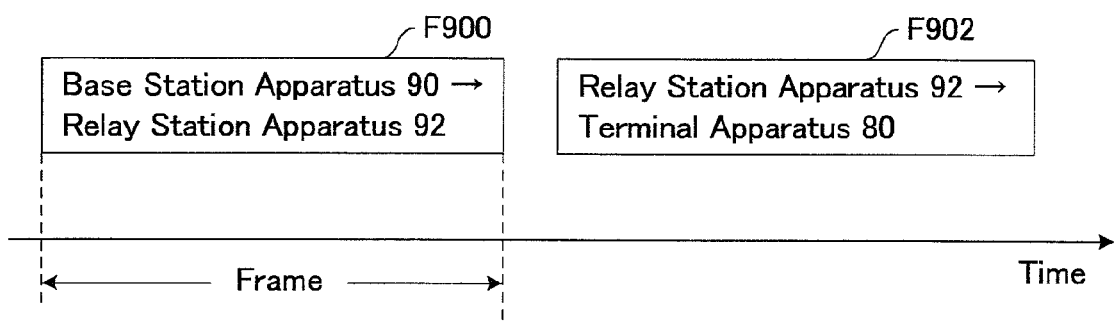
[FIG. 16] is a diagram for illustrating a conventional radio communication system.

Next, FIGS. 12, 13 and 14 show the transmitting unit of the base station apparatus, the relay station apparatus and the receiving unit of the terminal apparatus for realizing this radio communication system, respectively.

FIG. 12 is a diagram for mainly explaining the transmitter of base station apparatus 18. Base station apparatus 18 has the same configuration as base station apparatus 10 illustrated in FIG. 3, but is adapted to multiplex MBMS and the signal addressed to the terminal apparatus that directly communicates with the base station apparatus. That is, MBMS is input to encoder 102a as data to be transmitted while data for the terminal apparatus that directly communicates with the base station is input to encoder 102b as data to be transmitted.

Relay station apparatus 28 shown in FIG. 13 is the configuration of relay station apparatus 20 in the first embodiment shown in FIG. 4 to which a selector 260 is added. In the present embodiment, since MBMS (the signal demodulated first) transmitted from the base station apparatus at the higher power is transmitted to terminal apparatuses, the output signal from modulator 218 is input to pilot inserting unit 232 by means of selector 260 so as to be transmitted via D/A converter 234 to an unspecified large number of terminal apparatuses.

Addition of this selector 260 makes it possible for the relay station apparatus to deal with both the present embodiment and the first embodiment. When the signals addressed to two different terminal apparatuses are multiplexed as in the first embodiment, the output signal from modulator 218 is input to power coefficient multiplier 220 by means of selector 260.

The receiving unit 40 shown in FIG. 14 is the configuration of the receiving unit of terminal apparatus 30 in the first embodiment shown in FIG. 6 to which an encoder 350, a modulator 352, a power coefficient multiplier 354, a subtractor 356, a demodulator 358 and a decoder 360 are added, and performs the same process as the reception process of the terminal apparatus of the first embodiment. At this point, decoder 314 outputs MBMS data and decoder 360 outputs the data addressed to itself (data specific to the terminal apparatus).

In accordance with the above configuration, it is possible to transmit a broadcast service for an unspecified large number of terminal apparatuses and the signal addressed to a terminal apparatus that directly communicates with the base station apparatus, by multiplexing, and it is possible to prevent lowering of transmission efficiency even when broadcast service is distributed via a relay station apparatus.

Further, similarly to the first embodiment, it is possible to select, among a plurality of terminal apparatuses that directly communicate with base station apparatus 18, the terminal apparatus that can obtain the best reception performance or the terminal apparatus that can obtain reception quality equal to or greater than the predetermined threshold, as terminal apparatus 42 (the terminal that receives both MBMS and the signal specific to the terminal itself). This control also makes it possible to prevent lowering of the system efficiency due to occurrence of error in this terminal apparatus.

The invention claimed is:

1. A radio communication system including a base station apparatus, a relay station apparatus that receives a signal transmitted from the base station apparatus and re-transmits a signal to terminal apparatuses, a first terminal apparatus that directly receives the signal transmitted from the base station apparatus and a second terminal apparatus that receives the signal transmitted from the base station apparatus via the relay station apparatus, characterized in that the base station apparatus includes:
a generating means that generates a signal addressed to the first terminal apparatus and another signal that is different from the signal addressed to the first terminal apparatus and at least includes the second terminal apparatus as an address;
a multiplying means that multiplies the signals generated by the generating means by power coefficients to discriminate power between the signals;
an adding means that adds up the signals multiplied by the multiplying means; and,
a transmitting means that transmits signals added by the adding means.

2. The radio communication system according to claim 1, wherein the signal different from the signal addressed to the first terminal apparatus is a signal that is addressed to the second terminal apparatus only.

3. The radio communication system according to claim 2, wherein the multiplying means multiplies power coefficients so that the transmission power of the signal addressed to the first terminal apparatus is high and the transmission power of the signal addressed to the second terminal apparatus is low.

4. The radio communication system according to claim 3, wherein the base station apparatus further includes a selecting means for selecting a terminal apparatus that can obtain reception quality equal to or higher than a predetermined threshold, as the first terminal apparatus, from a plurality of terminal apparatuses that directly receive the signal transmitted from the base station apparatus.

5. The radio communication system according to claim 3, wherein the relay station apparatus includes:
a demodulating means that demodulates the signal addressed to the first terminal apparatus;
an extracting means that extracts the signal addressed to the second terminal apparatus, by subtracting the signal demodulated by the demodulating means, from the signal received from the base station apparatus; and,
a transmitting means that transmits the signal extracted by the extracting means toward the second terminal apparatus.

6. The radio communication system according to claim 5, wherein the relay station apparatus further includes:
an error detecting means that detects an error from the signal addressed to the first terminal apparatus or the signal addressed to the second terminal apparatus; and,
a transmission failure signal transmitting means that transmits a signal representing a failure of transmission to the base station apparatus when the error detecting means has detected an error.

7. The radio communication system according to claim 6, characterized in that when having determined that the signal addressed to the first terminal apparatus includes an enor, the relay station apparatus further transmits to the base station apparatus a signal that requests for temporal suspension of multiplexing of two signals.

8. The radio communication system according to claim 7, characterized in that when having determined that the signal addressed to the first terminal apparatus does not include an error but the signal addressed to the second terminal apparatus includes an error, the relay station apparatus further transmits to the base station apparatus a signal that requests for change in transmission power distribution.

9. The radio communication system according to claim 6, characterized in that when having determined that the signal addressed to the first terminal apparatus does not include an error but the signal addressed to the second terminal apparatus includes an error, the relay station apparatus further transmits to the base station apparatus a signal that requests for change in transmission power distribution.

10. The radio communication system according to claim 1, wherein the signal different from the signal addressed to the first terminal apparatus is a broadcast service signal that is transmitted to a large number of terminals.

11. The radio communication system according to claim 10, wherein the multiplying means multiplies power coefficients so that the transmission power of the broadcast service signal is high and the transmission power of the signal addressed to the first terminal apparatus is low.

12. The radio communication system according to claim 11, wherein the relay station apparatus includes:
   a demodulating means that demodulates the broadcast service signal; and,
   a transmitting means that transmits the demodulated broadcast service signal to a large number of terminal apparatuses.

13. The radio communication system according to claim 11, wherein the base station apparatus further includes a selecting means for selecting a terminal apparatus that can obtain reception quality equal to or higher than a predetermined threshold, as the first terminal apparatus, from a plurality of terminal apparatuses that directly receive the signal transmitted from the base station apparatus.

14. A base station apparatus connected to a radio communication system including a relay station apparatus that re-transmits a signal received from the base station apparatus toward terminal apparatuses, a first terminal apparatus that directly receives the signal transmitted from the base station apparatus, and a second terminal apparatus that receives the signal transmitted from the base station apparatus via the relay station apparatus, comprising:
   a generating means that generates a signal addressed to the first terminal apparatus and another signal that is different from the signal addressed to the first terminal apparatus and at least includes the second terminal apparatus as an address;
   a multiplying means that multiplies the signals generated by the generating means by power coefficients to discriminate power between the signals;
   an adding means that adds up the signals multiplied by the multiplying means; and,
   a transmitting means that transmits signals added by the adding means.

15. A relay station apparatus connected to a radio communication system including a base station apparatus, a first terminal apparatus that directly receives a signal transmitted from the base station apparatus, and a second terminal apparatus that receives a signal transmitted from the base station apparatus via the relay station apparatus, comprising:
   a receiving means that receives a signal from the base station apparatus;
   a demodulating means that demodulates the signal addressed to the first terminal apparatus, from the signal received by the receiving means;
   an extracting means that extracts the signal addressed to the second terminal apparatus, by subtracting the signal demodulated by the demodulating means, from the signal received by the receiving means; and,
   a transmitting means that transmits the signal extracted by the extracting means toward the second terminal apparatus.

16. A relay station apparatus connected to a radio communication system including a base station apparatus, a first terminal apparatus that directly receives a signal transmitted from the base station apparatus, and a second terminal apparatus that receives a signal transmitted from the base station apparatus via the relay station apparatus, comprising:
   a receiving means that receives a signal from the base station apparatus;
   a demodulating means that demodulates a broadcast service signal addressed to a large number of terminal apparatuses including the second terminal apparatus, from the signal received from the receiving means; and,
   a transmitting means that transmits the demodulated broadcast service signal to a large number of terminal apparatuses including the second terminal apparatus.

* * * * *